US010150047B2

(12) United States Patent
Lee

(10) Patent No.: US 10,150,047 B2
(45) Date of Patent: Dec. 11, 2018

(54) HOLOGRAM STAGE SETTING

(71) Applicant: ALL, THAT PERFORMANCE, INC., Seoul (KR)

(72) Inventor: Kwanjoon Lee, Seoul (KR)

(73) Assignee: ALL, THAT PERFORMANCE, INC, Seoul (KR)

(*) Notice: Subject to any disclaimer, the term of this patent is extended or adjusted under 35 U.S.C. 154(b) by 0 days.

(21) Appl. No.: 15/569,342

(22) PCT Filed: May 18, 2015

(86) PCT No.: PCT/KR2015/004965
§ 371 (c)(1),
(2) Date: Oct. 25, 2017

(87) PCT Pub. No.: WO2016/175366
PCT Pub. Date: Nov. 3, 2016

(65) Prior Publication Data
US 2018/0065059 A1 Mar. 8, 2018

(30) Foreign Application Priority Data
Apr. 28, 2015 (KR) .................. 10-2015-0059765

(51) Int. Cl.
*A63J 5/02* (2006.01)
*G03H 1/02* (2006.01)
(Continued)

(52) U.S. Cl.
CPC ................ *A63J 5/021* (2013.01); *A63J 5/02* (2013.01); *G02B 27/2228* (2013.01);
(Continued)

(58) Field of Classification Search
CPC ........ A63J 1/00; A63J 5/00; A63J 5/02; A63J 5/021; A63J 25/00; E04H 3/00;
(Continued)

(56) References Cited

U.S. PATENT DOCUMENTS 5,865,519 A * 2/1999 Maass .................. A63J 5/021
353/28
2010/0201949 A1* 8/2010 Barnett .................. G03B 25/00
352/101

FOREIGN PATENT DOCUMENTS

JP 11-064975 A 3/1999
JP 2005-234240 A 9/2005
(Continued)

*Primary Examiner* — Kien Nguyen
(74) *Attorney, Agent, or Firm* — Heedong Chae; Lucem, PC

(57) ABSTRACT

Disclosed is a hologram stage setting which is configured to apply a net screen of a grid network structure coated by a ceramic ball lens on the front part of a stage and directly project images, thereby enabling performance without specific limits on general multi-purpose stages instead of special stages, solving high cost problems caused by using a conventional foil screen, implementing high-resolution images, enhancing durability, and performing easy maintenance and repair. The hologram stage setting includes: a rear screen which is installed on the rear part of a stage to display a rear background image; a lower screen which is installed on the lower part of the stage to display a lower background image; a front screen which is installed on the front part of the stage to display a front hologram image; and a front hologram image projector which generates and projects the front hologram image.

5 Claims, 4 Drawing Sheets

(51) Int. Cl.
    *G03H 1/04*          (2006.01)
    *G03B 21/28*        (2006.01)
    *G03B 21/56*        (2006.01)
    *G02B 27/22*        (2018.01)

(52) U.S. Cl.
    CPC ............. *G03B 21/28* (2013.01); *G03H 1/02* (2013.01); *G03H 1/04* (2013.01); *G03H 1/0402* (2013.01); *G02B 27/2292* (2013.01); *G03H 2001/0228* (2013.01); *G03H 2001/0232* (2013.01); *G03H 2210/32* (2013.01); *G03H 2210/62* (2013.01)

(58) Field of Classification Search
    CPC ... E04H 3/22; E04H 3/24; G03H 1/02; G03H 1/04; G03B 21/00; G03B 21/56; G03B 21/60; G03B 21/62
    USPC .......... 472/61, 75, 81, 130; 359/3, 443, 449, 359/454
    See application file for complete search history.

(56) References Cited

FOREIGN PATENT DOCUMENTS

| | | |
|---|---|---|
| JP | 2005-300713 A | 10/2005 |
| JP | 2011-255532 A | 12/2011 |
| KR | 10-0863280 B1 | 10/2008 |
| KR | 10-2008-0101876 A | 11/2008 |
| KR | 10-2010-0051225 A | 5/2010 |
| KR | 10-2013-003145 A | 1/2013 |

\* cited by examiner

HOLOGRAM STAGE SETTING

CROSS-REFERENCE TO RELATED APPLICATION

This application claims the benefit of Korean application No. 10-2015-0059765, filed on Apr. 28, 2015 with the Korean Intellectual Property Office, the disclosure of which is incorporated herein by reference.

TECHNICAL FIELD

The present invention relates to a hologram stage setting, and more specifically, to a hologram stage setting that enables performance in a reality environment where reality and virtuality are fused.

BACKGROUND ART

Recently, performance of musicals and the like tends to increase in a reality environment that connects reality and virtuality in a situation where market demand for realistic contents is increasing.

A hologram stage setting in the related art for performance in the reality environment is illustrated in FIG. 1. Referring to FIG. 1, in the hologram stage setting in the related art, a performer 1 stands on a stage and a foil screen is installed at an angle of 45° in front of the performer 1. Further, a reflector 30 is installed on the lower side of the foil screen and a projector 20 for projecting images to the reflector 30 is installed at the upper side of a stage setting.

Accordingly, in the case of using the hologram stage setting in the related art, a 3-dimensional image is implemented through floating type indirect projection of projecting an image 2 from the projector 20 to the reflector 30 and reflecting the image 20 to project an image 3 even onto the foil screen.

However, in hologram stage device in the related art described above, since the foil screen needs to be installed at an angel of 45°, there is a problem in that a large installation space needs to be secured, and since many additional structures such as an iron frame 10 need to be installed, there is a problem in that a special stage needs to secured during performance.

In addition, since the foil screen depends on imported goods, there is a problem in that the costs are increased when forming the hologram stage setting.

Further, in the case of the foil screen, there is a problem in that it is difficult to implement high-resolution images.

Further, in the case of the foil screen, there is a problem in that the durability is poor, maintenance is difficult, and repair is impossible.

PRIOR ART DOCUMENT

Patent Document (Patent Document 1) Korean Patent Publication No. 10-2013-0003145

DISCLOSURE

Technical Problem

In order to solve the above-mentioned problems, an object of the present invention is to provide a hologram stage setting which is configured to apply a net screen of a grid network structure coated by a ceramic ball lens on the front part of a stage and directly project images, thereby enabling performance without specific limits on general multi-purpose stages instead of special stages, solving high cost problems caused by using a conventional foil screen, implementing high-resolution images, enhancing durability, and performing easy maintenance and repair.

Technical Solution

According to an aspect of the present invention, there is provided a hologram stage setting including: a rear screen which is installed at the rear part of the stage to display a rear background image; a lower screen which is installed at the lower part of the stage to display a lower background image; a front screen which is installed at the front part of the stage to display a front hologram image; and a front hologram image projector which generates and projects the front hologram image.

The front hologram image projector may be disposed at the upper front side of the front screen to directly project the front hologram image to the front screen.

The front screen may include a net screen of a grid network structure coated by a ceramic ball lens and a support member which is installed along the edge of the net screen to keep the shape of the net screen.

The net screen may have a tensile strength of 150 kg/mm$^2$ or more and an elongation of 4% or less.

The ceramic ball lens coating the net screen may have a particle size of 70 μm.

The adhesion of the ceramic ball lens may be 99% or more.

A reflection coefficient of the net screen may be 3.0 Gain.

A maximum elongation of the net screen may be 4%.

Advantageous Effects

According to the exemplary embodiment of present invention, the hologram stage setting is configured to apply a net screen of a grid network structure coated by a ceramic ball lens on the front part of a stage and directly project images, thereby enabling performance without specific limits on general multi-purpose stages instead of special stages, solving high cost problems caused by using a conventional foil screen, implementing high-resolution images, enhancing durability, and performing easy maintenance and repair.

MODES OF THE INVENTION

Figure 1:
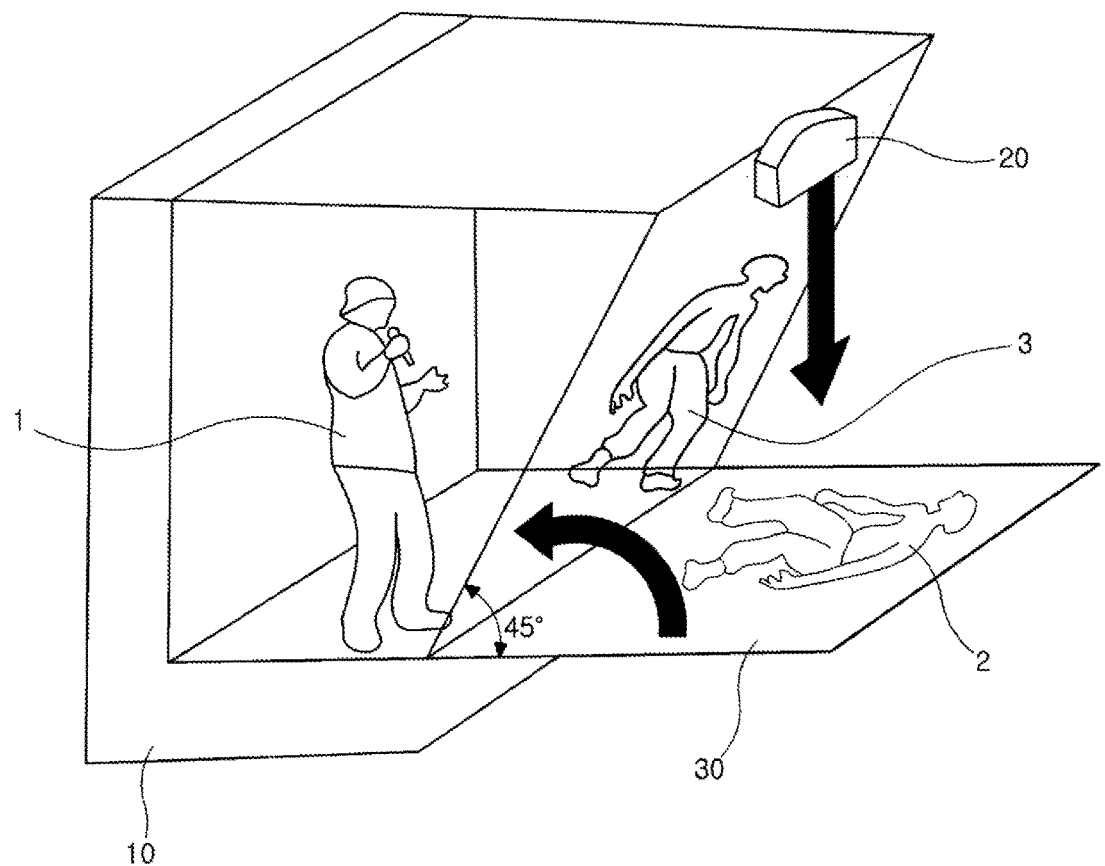
FIG. 1 is a diagram illustrating a hologram stage setting in the related art.

Hereinafter, the present invention will be described in detail with reference to the accompanying drawings.

However, in the following description of the present invention, a detailed explanation of known related functions or configurations may be omitted to avoid unnecessarily obscuring the subject matter of the present invention. It is noted that even if the terms are the same, when displayed parts are different, reference numerals do not coincide with each other.

In addition, since terms to be described below as terms configured by considering the functions in the present invention may vary depending on intentions of users such as experimenter and measurers or practices, the terms will be defined based on contents throughout the present specification.

Terms, such as first, second, and the like may be used to describe various components and the components should not be limited by the terms. The terms are used to only distinguish one component from another component. For example, a first component may be referred to as a second component, and similarly, the second component may be referred to as the first component without departing from the scope of the present invention. A term 'and/or' includes a combination of a plurality of associated disclosed items or any item of the plurality of associated disclosed items.

Terms used in the present specification are used only to describe specific embodiments, and are not intended to limit the present invention. Singular expressions used herein include plurals expressions unless they have definitely opposite meanings.

If it is not contrarily defined, all terms used herein including technological or scientific terms have the same meaning as those generally understood by a person with ordinary skill in the art. Terms defined in generally used dictionary shall be construed that they have meanings matching those in the context of a related art, and shall not be construed in ideal or excessively formal meanings unless they are clearly defined in the present application.

Throughout the specification, unless explicitly described to the contrary, the word "comprise" and variations such as "comprises" or "comprising" will be understood to imply the inclusion of stated elements but not the exclusion of any other elements.

Hereinafter, preferred exemplary embodiments of the present invention will be described in detail with reference to the accompanying drawings.

Figure 2:
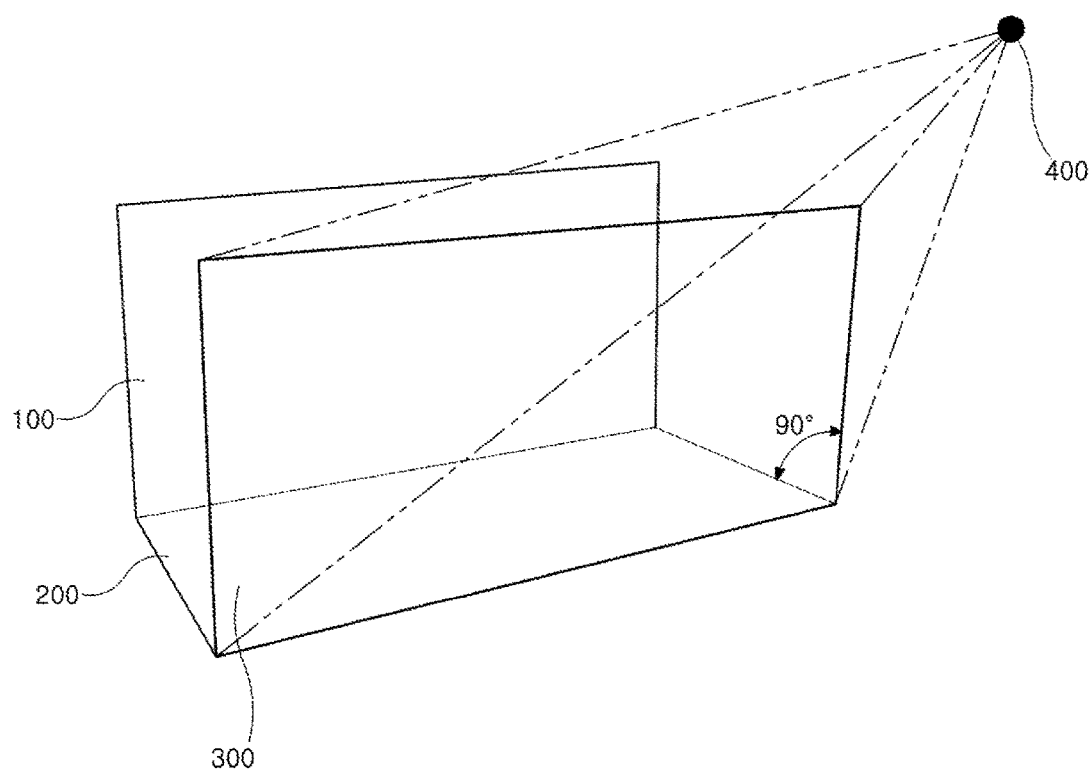
FIG. 2 is a diagram schematically illustrating a hologram stage setting according to an exemplary embodiment of the present invention.
Figure 3:
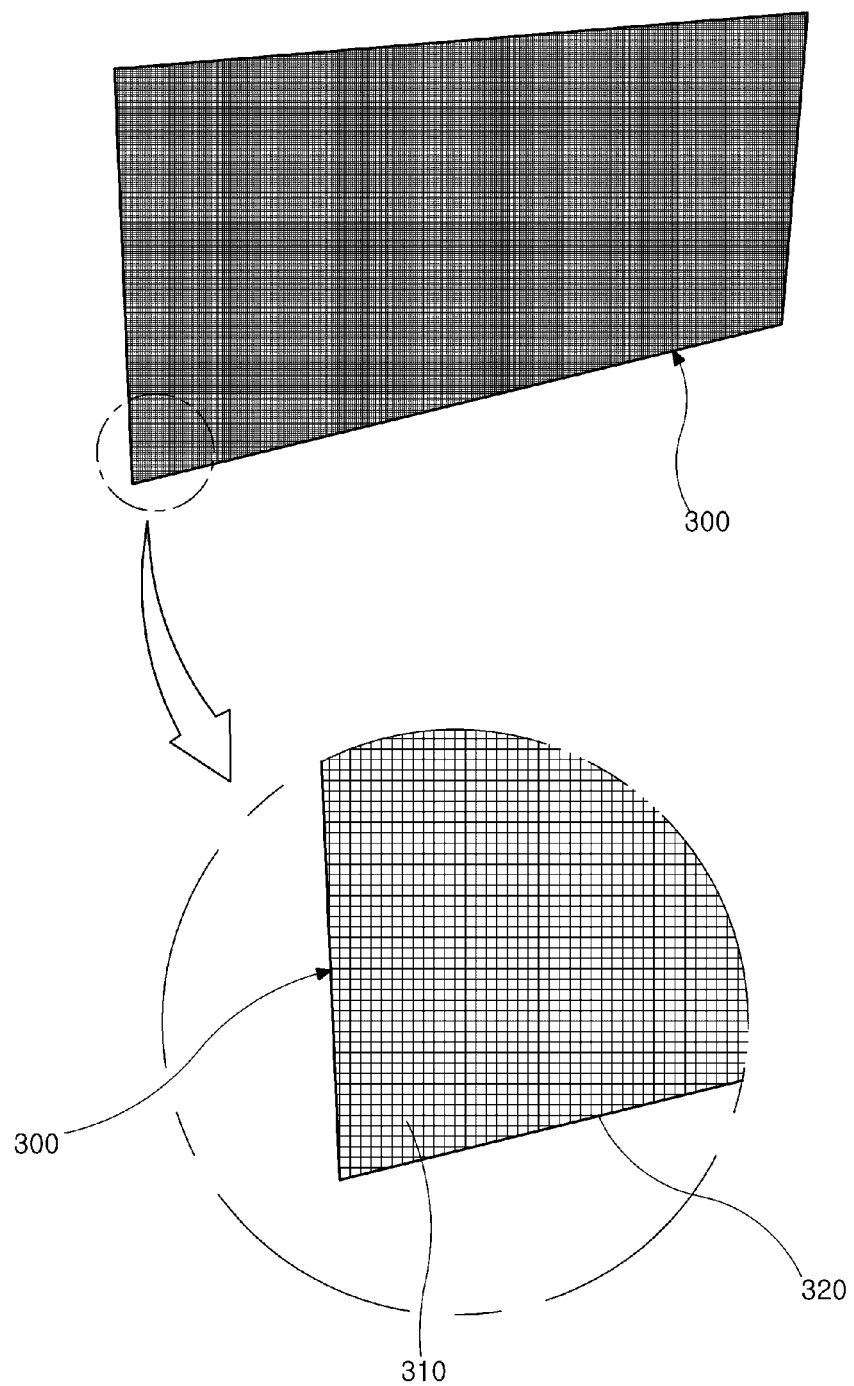
FIG. 3 is a diagram illustrating a front screen which is applied to the hologram stage setting according to the exemplary embodiment of the present invention.
Figure 4:
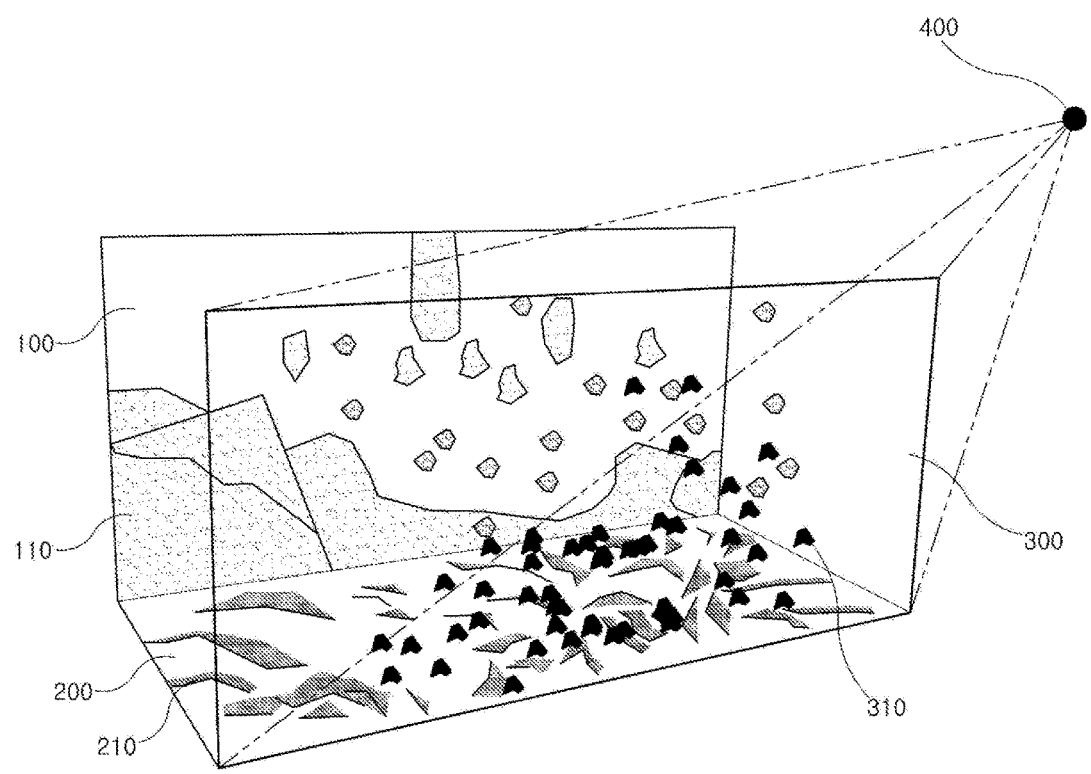
FIG. 4 is a diagram illustrating a state in which an image is projected to the hologram stage setting according to the exemplary embodiment of the present invention.

FIG. 1 is a diagram illustrating a hologram stage setting in the related art, FIG. 2 is a diagram schematically illustrating a hologram stage setting according to an exemplary embodiment of the present invention, FIG. 3 is a diagram illustrating a front screen which is applied to the hologram stage setting according to the exemplary embodiment of the present invention, and FIG. 4 is a diagram illustrating a state in which an image is projected to the hologram stage setting according to the exemplary embodiment of the present invention.

Referring to FIGS. 1 to 4, a hologram stage setting according to an exemplary embodiment of the present invention includes a rear screen 100, a lower screen 200, a front screen 300, and a front hologram image projector 400.

The rear screen 100 is a screen which is installed at the rear part of the stage to display a rear background image 110. The rear background image displayed on the rear screen 100 may be projected by a separate projector installed on the upper front side of the stage setting, but may be projected by a projector disposed on the rear surface of the rear screen 100.

The lower screen 200 is a screen which is installed at the lower part of the stage to display a lower background image 210. The lower background image displayed on the lower screen 200 may be projected by a separate projector installed on the upper side of the stage setting, but may be projected by a projector disposed on the bottom of the lower screen 200.

The front screen 300 is a screen which is installed at the front part of the stage to display a front hologram image. The front screen 300 is installed to be erected at an angle of 90° with the lower screen 200.

The front hologram image projector 400 generates a front hologram image to directly project the generated front hologram image to the front screen 300 which is erected at the angle of 90°.

The front hologram image projector 400 is disposed at the upper front side of the front screen 300.

Meanwhile, as illustrated in FIG. 3, the front screen 300 includes a net screen of a grid network structure coated by a ceramic ball lens and a support member 320 which is installed along the edge of the net screen 310 to keep the shape of the net screen.

Herein, the net screen 310 is formed to have a tensile strength of 150 kg/mm$^2$ or more and an elongation of 4% or less by an ultrafine particle ceramic ball coating method. The net screen 310 having the tensile strength and the elongation may have high durability and safety.

Meanwhile, the ceramic ball lens used in the ultrafine particle ceramic ball coating method has a particle size of 70 μm or less, and when the net screen 310 is coated using the ultrafine particle ceramic ball lens, a high-resolution stage image may be implemented by the net screen 310.

Meanwhile, the ceramic ball lens may use a ceramic ball lens having adhesion of 99% or more. When the net screen 310 is coated using the ceramic ball lens having the adhesion of 99% or more, the best image quality may be implemented by the net screen 310.

The net screen 310 may have a reflection coefficient of 3.0 Gain or more. As such, when the net screen 310 is configured with high brightness of the reflection coefficient of 3.0 Gain or more, a higher-resolution stage image may be implemented.

According to the present invention described above, the hologram stage setting is configured to apply a net screen of a grid network structure coated by a ceramic ball lens on the front part of a stage and directly project images, thereby enabling performance without specific limits on general multi-purpose stages instead of special stages, solving high cost problems caused by using a conventional foil screen, implementing high-resolution images, enhancing durability, and performing easy maintenance and repair.

While the specific exemplary embodiments of the present invention have been illustrated and described above, various modifications and changes may be made by a person with ordinary skill in the art to which the present invention pertains without departing from the spirit and the scope of the present invention that are disclosed in the claims.

The invention claimed is:

1. A hologram stage setting, comprising:
   a rear screen which is installed at the rear part of the stage to display a rear background image;
   a lower screen which is installed at the lower part of the stage to display a lower background image;
   a front screen which is installed at the front part of the stage to display a front hologram image; and
   a front hologram image projector which generates and projects the front hologram image,
   wherein the front hologram image projector is disposed at the upper front side of the front screen to directly project the front hologram image to the front screen, and wherein the front screen includes a net screen of a grid network structure coated by a ceramic ball lens and a support member which is installed along the edge of the net screen to keep the shape of the net screen.

2. The hologram stage setting of claim 1, wherein the net screen has a tensile strength of 150 kg/mm$^2$ or more and an elongation of 4% or less.

3. The hologram stage setting of claim 2, wherein the ceramic ball lens coating the net screen has a particle size of 70 μm.

4. The hologram stage setting of claim 3, wherein the adhesion of the ceramic ball lens is 99% or more.

5. The hologram stage setting of claim 4, wherein a reflection coefficient of the net screen is 3.0 Gain.

* * * * *